United States Patent [19]
Benson et al.

[11] 3,983,437
[45] Sept. 28, 1976

[54] ELECTROMAGNETIC RADIATION DETECTOR

[75] Inventors: Jay L. Benson; Gordon J. Hansen, both of Albuquerque, N. Mex.

[73] Assignee: The United States of America as represented by the United States Energy Research and Development Administration, Washington, D.C.

[22] Filed: Mar. 12, 1968

[21] Appl. No.: 713,279

[52] U.S. Cl. ................................ 313/99; 250/207; 315/11
[51] Int. Cl.² .......................................... H02K 7/10
[58] Field of Search ............... 250/83, 207; 313/94, 313/95, 102, 106, 99, 101; 315/11

[56] References Cited
UNITED STATES PATENTS

| | | | |
|---|---|---|---|
| 2,890,360 | 6/1959 | Jacobs et al. ...................... | 313/101 |
| 3,183,390 | 5/1965 | Grader et al. ........................ | 313/94 |
| 3,235,765 | 2/1966 | Goodrich et al. .................... | 250/207 |

*Primary Examiner*—Maynard R. Wilbur
*Assistant Examiner*—S. C. Buczinski
*Attorney, Agent, or Firm*—Dean E. Carlson; Dudley W. King; Richard E. Constant

[57] ABSTRACT

An electromagnetic radiation detector including a collimating window, a cathode member having a photoelectric emissive material surface angularly disposed to said window whereby radiation is impinged thereon at acute angles, an anode, separated from the cathode member by an evacuated space, for collecting photoelectrons emitted from the emissive cathode surface, and a negatively biased, high transmissive grid disposed between the cathode member and anode.

9 Claims, 4 Drawing Figures

Jay L. Benson
Gordon J. Hansen
*INVENTOR.*

ELECTROMAGNETIC RADIATION DETECTOR

BACKGROUND OF INVENTION

A material may be photoemissive if high energy electrons are ejected from the material by photons of electromagnetic radiation by the process known as the photoelectric effect. Vacuum tubes which commonly include a photoemissive cathode or emitter and an anode for collecting electrons emitted from the cathode are generally referred to as phototubes or photodiodes. The number of high energy electrons emitted from the photoemissive material (i.e., the cathode) is generally inversely related to the energy (photons) of the radiation impinging against the material in a predictable relationship. Thus, phototubes may be made and calibrated to measure most forms of electromagnetic radiation.

When a high energy electron (commonly known as a photoelectron or primary electron) is ejected from a photoelectric emissive cathode by photons impinging thereon, a substantial number of low energy secondary electrons may also be ejected from the cathode and collected by the anode. The number of secondary electrons ejected for each photoelectron may not be readily determined by calculation or calibration and, furthermore, may vary during use of the phototube. Thus, the outputs or response of these phototubes may not be predictable in a given radiation field and may be highly nonlinear or energy dependent. At high rates of photoelectric emissions, a correspondingly high rate of secondary electron ejection may also occur which may produce space charge effects and consequently further limit the linearity or increase the energy dependence of phototube response. In mixed radiation fields, the outputs produced by a given photon of radiation may mask outputs of other photons of radiation due to the different rates of secondary electron production.

Some prior phototubes have utilized high biasing or collecting fields to attempt to overcome these space charge effects. The sensitivity is then a strong function of the secondary emission coefficient which may change from detector to detector and in any one detector with time. The secondary emission coefficient may also be affected by the condition of the surface of the cathode since different surface conditions may produce different numbers of secondary electrons in a given mixed radiation field. Thus, these phototubes required precise manufacturing techniques and controls to insure a uniform surface condition. Further, since the phototube output signal includes low energy secondary electrons which require a greater time to reach the anode than high energy primary electrons, the response time of the phototube may be limited by the secondary electron transit time.

SUMMARY OF INVENTION

In view of limitations of the prior art such as noted above, it is an object of this invention to provide a highly sensitive electromagnetic radiation detector.

It is a further object of this invention to provide an electromagnetic radiation detector having a more predictable and linear response.

It is a further object of this invention to provide an electromagnetic radiation detector having a fast response time for transient radiation pulses.

Various other objects and advantages will appear from the following description of one embodiment of the invention, and the most novel features will be particularly pointed out hereinafter in connection with the appended claims.

The invention comprises an electromagnetic radiation detector including a cathode member having a base portion and an apex portion joined by photoelectric emissive material segments or areas, anode means separated from the cathode member by a substantially evacuated space, grid means disposed between said cathode member and said anode means, and means for facilitating impinging radiation at acute angles of incidence against the cathode member segments.

DESCRIPTION OF DRAWINGS

The invention is shown in the following drawings wherein.

DETAILED DESCRIPTION

Figure 1:
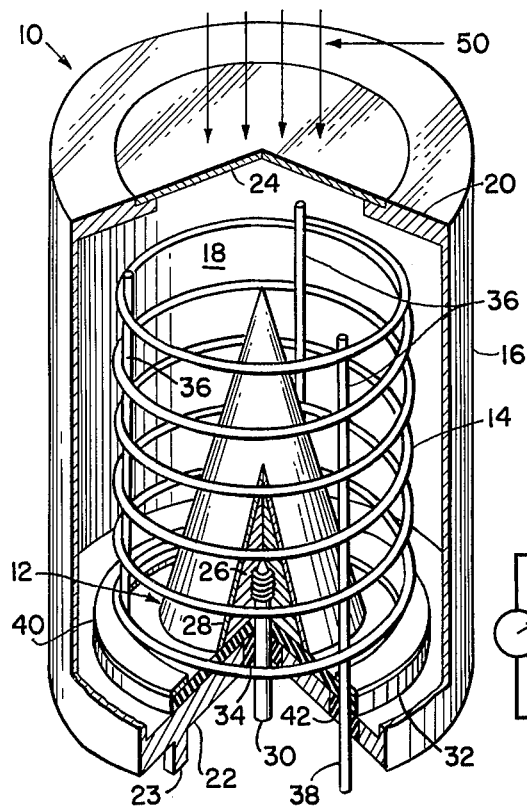
FIG. 1 is a partially cutaway, perspective view of an embodiment of the electromagnetic radiation detector.

Referring to FIG. 1, electromagnetic radiation detector 10 may include a photoelectric emissive cathode 12, a high transmissive grid 14 and an anode 16. Cathode 12 and grid 14 may be separated from each other and anode 16 by a substantially evacuated space 18.

In the embodiment shown, anode 16 may also form the outer case of a vacuum housing together with end walls 20 and 22 and a suitably sealed window 24. Anode 16 and end walls 20 and 22 may be formed of a conductive material which may have sufficient mechanical strength to withstand the vacuum and be essentially opaque or impervious to the radiation being measured. Anode 16 may be connected to conventional monitoring instruments through ground by a connector jack or post 23. Window 24 may be made of a suitable material such as beryllium, polyethylene terephthalate, or any other material at a thickness which is pervious to any desired radiation.

The vacuum housing may be evacuated to a desired vacuum, possibly less than $10^{-5}$ Torr, by a conventional vacuum pump system (not shown) and the housing sealed. In order to maintain this vacuum, a flash-getter and getter shield (not shown) may be positioned within the housing and fired or a small ion pump may be connected directly to the housing and operated continuously or periodically as needed.

There may be applications where an anode separate from the vacuum housing may be positioned within a vacuum housing in the same general location with respect to the grid and the cathode so as to receive photoelectrons ejected therefrom as shown by anode 16 in FIG. 1. There are other applications such as where the detector is used to calibrate an evacuated radiation source where the detector may be positioned within the source housing without a separate vacuum housing The quantum efficiency (i.e., the number of primary electrons ejected per incident photon of electromagnetic radiation) may be inversely dependent on the energy of radiation (photons) and the incident angle of the photon to the surface, and directly dependent on the Z number of the surface material. Thus, it has been found that cathode 12 may be any conventional shape, for example such as a cone shown in FIG. 1, having an apex portion and a base portion joined by photoelectric emissive sides or surfaces which may be subjected to electromagnetic radiation passing through window 24 at substantially equal acute angles of incidence. The angle of slope of the sides of cathode 12 may be as steep as convenient to provide the greatest quantum efficiency. In order to prevent impinging any radiation against any other elements of detector 10 which may also eject primary electrons and thus affect the detector output, the base portion of cathode 12 should be at least as large as the effective opening of window 24.

The cathode 12 may include a generally solid core or base 26 of easily formed, relatively inexpensive, electrically conductive material such as aluminum or copper covered with a thin film or coating 28 of any conductive, photoelectric emissive materials (including aluminum, copper, gold or silver). Film 28 may be applied by any conventional deposition or plating technique. Since the collected primary electrons may be generated at a relatively shallow depth within the photoelectric emissive material, depending on the material, the thickness of this material may be kept at a minimum just slightly greater than the effective range of the highest energy primary electrons of interest.

Figure 2:
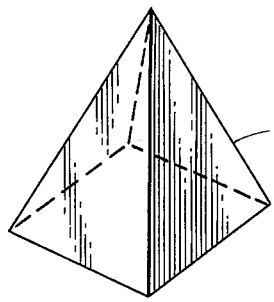
FIG. 2 is a perspective view of a cathode which may be used in the detector of FIG. 1.

Cathode 12 may also be formed by casting or machining the desired hollow or solid shape from the photoelectric emissive materials mentioned above. Cathode 12 may be formed into other shapes depending upon the desired application and ease of manufacture, for example, such as a pyramid having a polygonal base portion as shown by cathode 12a in FIG. 2 or a planar electrode disposed at an obtuse angle with respect to window 24 over the effective opening thereof.

Cathode 12 may be suitably mounted in detector 10 aligned with window 24 and connected to conventional monitoring instruments by a suitable connector jack or post 30 passing through end wall 22. The cathode may be mounted so as to be suspended above end wall 22 or it may rest upon an insulating disc or platform 32 against the inner surface of the end wall. Connector jack 30 may be insulated from end wall 22 by a vacuum sealing plug 34. The insulation between the respective elements of the detector should be designed to prevent any electrical leakage so as to permit measurement of signal current which may be as low as $10^{-15}$ amps at the highest energy levels of radiation detected.

Grid 14 may be any conventional high transmissive, generally cylindrical grid structure having a transmissivity of about 90–95%. The grid may be made of any conventional electrically conductive grid wire material such as molybdenum or tungsten. In FIG. 1, grid 14 is shown as a wire helix mounted on conventional electrically conductive posts or rods 36. One or more of the rods may pass through end wall 22 and terminate as a connector jack or post 38. Rods 36 may be interconnected by a suitable strip conductor 40 along the surface of disc 32. Connector jack 38 may be insulated from end wall 22 by vacuum seal 42 in the same manner as seal 34.

Figure 3:
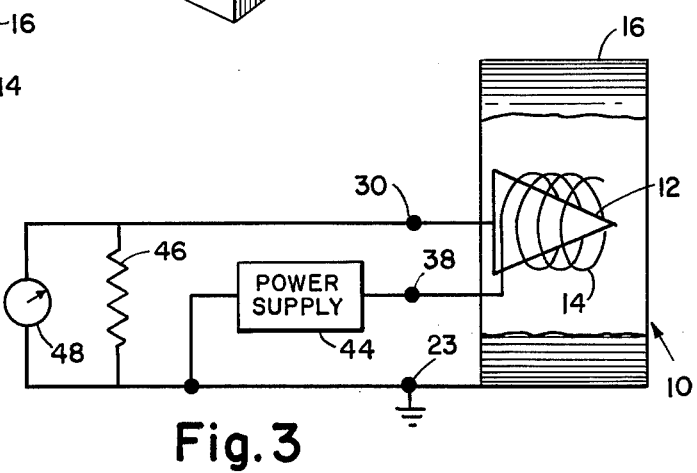
FIG. 3 is a schematic diagram showing the electrical connections of the detector of FIG. 1.

The detector 10 may be connected to conventional monitoring instrumentation in the manner shown in FIG. 3. Grid 14 may be connected to the negative terminal of a conventional direct current power supply 44, such as a battery, through connector jack 38. Anode 16 may be connected through connector jack 23 and ground to the positive terminal of supply 44 and one end of a current sensing device such as resistor 46. Cathode 12 may be connected through connector jack 30 to the other end of resistor 46. The current passing between cathode 12 and anode 16 through resistor 46 may be sensed by measuring device or meter 48.

When detector 10 is subjected to a radiation field, such as field 50 in FIG. 1, radiation may pass through window 24 and strike cathode 12 at acute angles of incidence. The photons of radiation may penetrate the surface of the cathode and eject or release primary electrons (including photoelectrons, Auger electrons, and Compton electrons) from atoms in the photoelectric emissive material which may then escape from the material. The photons of radiation, which generally travel in parallel or near parallel paths as shown when distance between the radiation source and detector is large, may impinge upon the surface of the cathode at substantially equal angles and thus produce substantially equal quantities of photoelectrons per incident photon. The high energy primary electrons emitted from the surface of cathode 12 may then travel through grid 14 and and be collected by anode 16. Since grid 14 is highly transmissive and negatively biased, very few primary electrons may strike the grid wires and be blocked from anode 16. The secondary electrons emitted with the primary electrons generally have insufficient energy to cross the barrier imposed by the negative grid bias and may be suppressed or forced back to the cathode without reaching the anode. The current generated by the primary electrons may then be sensed by meter 48.

A typical radiation detector may utilize a conical cathode about 1.4 inches high and having a base portion about 1 inch in diameter and cone angle of about 30° with a window about 1 inch in diameter. The cathode may be made of aluminum with a gold film deposited thereon about 0.0015 inch thick. The grid may be made of about 0.005 inch diameter wire wound in a helix with grid wire spacing of about 0.1 inch. The anode or housing may be made of about 0.03 inch thick stainless steel with outside dimensions of about 2.5 inches long by about 2.5 inches in diameter. The window may be of beryllium at a thickness depending on the energy of the radiation to be measured.

Figure 4:
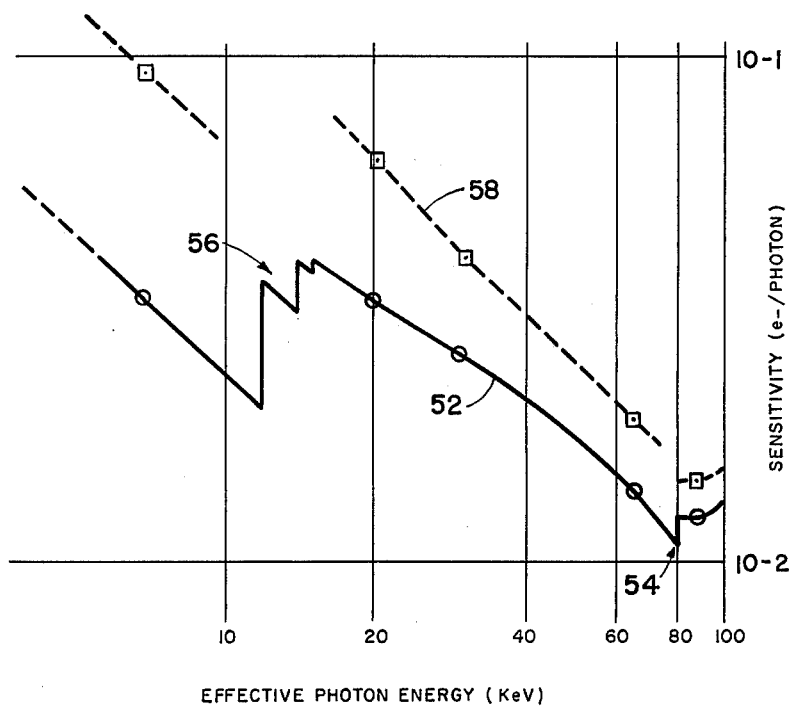
FIG. 4 is a graph showing the operating characteristics of the detector of FIG. 1.

An electromagnetic radiation detector of the type shown in FIG. 1 with the above dimensions may produce primary electrons per photon as radiation energy increases as shown by curve 52 in FIG. 4 with a bias of about −300 volts on the grid. The discontinuities indicated at points 54 and 56 correspond with points of X-ray absorption for the particular photoelectron emissive material, in this case gold. The points connected by curve 58 were measured with a positive 300 volts bias on the grid to effect collection of all secondary electrons (the curve has been drawn with dotted lines and with some portions removed as insufficient knowledge of secondary emission coefficients as a function of emerging primary electron energy does not permit calculation of the complete curve shape.) As can be seen, curve 58 is a more steeply varying function of photon energy and thus more energy dependent than curve 52. Curve 58, as noted above, may vary in shape and slope with time and from detector to detector whereas curve 52 has been found to be substantially repeatable for different detectors over a long period of time.

An electromagnetic radiation detector made in accordance with this invention may thus sense radiations over a wide range of energy in a mixed field with a more predictable and linear response than that achieved by prior detectors. Such detectors may operate without any of the limiting features caused by secondary electrons.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. An electromagnetic radiation detector having a central axis and a radiation entrance end, comprising a cathode member having an exterior photoelectric emissive surface disposed at an acute angle to said central axis, anode means separated from and cylindrically disposed about said cathode member for collecting primary electrons emitted from said emissive cathode surface, high transmissive grid means disposed between said cathode member and said collecting means for blocking secondary electrons emitted from said emissive cathode surface with said primary electrons.

2. The detector of claim 1 wherein said emissive surface is in a conical configuration and said cathode member comprises a solid core.

3. The detector of claim 2 wherein said photoelectric emissive material is gold.

4. The detector of claim 2 wherein said grid means is in the configuration of a helix.

5. The detector of claim 4 wherein said grid means has a transmissivity of at least about 90%.

6. The detector of claim 1 wherein said grid means is biased at a voltage negative with respect to said cathode member and said collector by an amount on the order of at least about 200 volts.

7. The detector of claim 1 wherein said cathode member and said collector means are biased at the same potential.

8. The detector of claim 1 including means integral with said anode means for restricting impinging radiation to that striking said emissive cathode surface at acute angles of incidence.

9. The detector of claim 8 wherein said collecting means forms a radiation impervious housing around said cathode member and grid means and said impinging means is a radiation pervious window in said collecting means.

* * * * *